United States Patent
Shah et al.

(10) Patent No.: US 8,798,013 B1
(45) Date of Patent: Aug. 5, 2014

(54) METHOD AND SYSTEM FOR MANAGEMENT OF DATA TRANSMISSION IN TIMESLOTS

(75) Inventors: Maulik K. Shah, Overland Park, KS (US); Jasinder P. Singh, Olathe, KS (US); Deveshkumar Rai, Overland Park, KS (US); Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 709 days.

(21) Appl. No.: 13/072,381

(22) Filed: Mar. 25, 2011

(51) Int. Cl.
*H04J 3/00* (2006.01)
*H04W 4/00* (2009.01)
*H04J 3/16* (2006.01)
*H04W 72/00* (2009.01)

(52) U.S. Cl.
USPC .................... 370/336; 370/341; 370/468

(58) Field of Classification Search
None
See application file for complete search history.

(56) References Cited

U.S. PATENT DOCUMENTS

| | | |
|---|---|---|
| 5,617,059 A | 4/1997 | Eggleston |
| 5,796,722 A | 8/1998 | Kotzin et al. |
| 5,809,398 A | 9/1998 | Moberg et al. |
| 5,898,382 A | 4/1999 | Treatch |
| 5,898,681 A | 4/1999 | Dutta |
| 5,987,304 A | 11/1999 | Latt |
| 5,995,498 A | 11/1999 | Toot, Jr. et al. |
| 5,999,816 A | 12/1999 | Tiedemann, Jr. et al. |
| 6,002,664 A | 12/1999 | Schacter |
| 6,021,123 A | 2/2000 | Mimura |
| 6,038,448 A | 3/2000 | Chheda et al. |
| 6,047,191 A | 4/2000 | Desgagne |
| 6,088,590 A | 7/2000 | Anderson et al. |
| 6,119,005 A | 9/2000 | Smolik |
| 6,132,306 A | 10/2000 | Trompower |
| 6,289,724 B1 | 9/2001 | Varma et al. |
| 6,295,453 B1 | 9/2001 | Desgagne et al. |
| 6,360,098 B1 | 3/2002 | Ganesh et al. |
| 6,400,951 B1 | 6/2002 | Vaara |
| 6,404,775 B1 | 6/2002 | Leslie et al. |
| 6,463,298 B1 | 10/2002 | Sorenson et al. |
| 6,477,354 B1 | 11/2002 | Roberts et al. |
| 6,532,221 B1 | 3/2003 | Kim et al. |
| 6,535,736 B1 | 3/2003 | Balogh et al. |

(Continued)

FOREIGN PATENT DOCUMENTS

| | | |
|---|---|---|
| EP | 1 294 203 | 3/2002 |
| WO | WO 98/53621 | 11/1998 |
| WO | WO2005011150 | 2/2005 |
| WO | WO2006052759 | 5/2006 |

OTHER PUBLICATIONS

Down and Lewis, "Dynamic Load Balancing in Parallel Queueing Systems: Stability and Optimal Control," Jul. 15, 2004.

(Continued)

*Primary Examiner* — Chirag Shah
*Assistant Examiner* — Srinivasa Reddivalam

(57) ABSTRACT

A method and system is disclosed for managing transmission of data in upcoming timeslots on an air interface. A radio access network detects that in the upcoming timeslots, less than a threshold portion of currently-contending devices are scheduled to receive transmissions, and the radio access network responsively de-schedules a number of the devices and schedules in their place a greater number of other devices, where the newly scheduled devices have higher forward link data rates than the de-scheduled devices.

19 Claims, 4 Drawing Sheets

(56) References Cited

U.S. PATENT DOCUMENTS

| | | | |
|---|---|---|---|
| 6,542,741 | B2 | 4/2003 | Wallstedt et al. |
| 6,546,248 | B1 | 4/2003 | Jou et al. |
| 6,571,284 | B1 | 5/2003 | Suonvieri |
| 6,625,132 | B1 | 9/2003 | Boettger et al. |
| 6,658,269 | B1 | 12/2003 | Golemon et al. |
| 6,690,915 | B1 | 2/2004 | Ito et al. |
| 6,697,603 | B1 | 2/2004 | Lovinggood et al. |
| 6,735,432 | B1 | 5/2004 | Jarett et al. |
| 6,748,215 | B1 | 6/2004 | Chen et al. |
| 6,754,196 | B1 | 6/2004 | Daane et al. |
| 6,845,245 | B2 | 1/2005 | Hunzinger |
| 6,845,248 | B1 | 1/2005 | Johnson |
| 6,993,287 | B2 | 1/2006 | O'Neill |
| 7,006,797 | B1 | 2/2006 | Sullivan et al. |
| 7,024,217 | B2 | 4/2006 | Hunzinger |
| 7,035,587 | B1 | 4/2006 | Yarkosky |
| 7,046,964 | B1 | 5/2006 | Sullivan et al. |
| 7,177,658 | B2 | 2/2007 | Willenegger et al. |
| 7,190,937 | B1 | 3/2007 | Sullivan et al. |
| 7,228,134 | B2 | 6/2007 | Gandhi et al. |
| 7,299,005 | B1 | 11/2007 | Yarkosky et al. |
| 7,302,265 | B1 | 11/2007 | Chalishazar et al. |
| 7,400,901 | B2 | 7/2008 | Kostic et al. |
| 7,480,485 | B1 | 1/2009 | Oh et al. |
| 7,885,239 | B1 * | 2/2011 | Oroskar et al. ............... 370/336 |
| 8,320,313 | B1 | 11/2012 | Singh et al. |
| 2001/0031621 | A1 | 10/2001 | Schmutz |
| 2001/0036837 | A1 | 11/2001 | Uistola |
| 2002/0044594 | A1 | 4/2002 | Bongfeldt |
| 2002/0045431 | A1 | 4/2002 | Bongfeldt |
| 2002/0080743 | A1 | 6/2002 | Morita et al. |
| 2002/0183039 | A1 | 12/2002 | Padgett et al. |
| 2002/0186710 | A1 | 12/2002 | Alvesalo et al. |
| 2002/0186749 | A1 | 12/2002 | Jones |
| 2003/0073444 | A1 | 4/2003 | Kogiantis et al. |
| 2003/0083069 | A1 | 5/2003 | Vadgama |
| 2003/0114103 | A1 | 6/2003 | Dinkel et al. |
| 2003/0119505 | A1 | 6/2003 | Jou et al. |
| 2003/0176192 | A1 | 9/2003 | Morimoto et al. |
| 2003/0224733 | A1 | 12/2003 | Schwarz et al. |
| 2004/0005890 | A1 | 1/2004 | Holma et al. |
| 2004/0102167 | A1 | 5/2004 | Shim et al. |
| 2004/0106408 | A1 | 6/2004 | Beasley et al. |
| 2004/0204097 | A1 | 10/2004 | Scheinert et al. |
| 2004/0213182 | A1 | 10/2004 | Huh et al. |
| 2005/0075125 | A1 | 4/2005 | Bada et al. |
| 2005/0096053 | A1 | 5/2005 | Liu et al. |
| 2005/0148368 | A1 | 7/2005 | Scheinert et al. |
| 2005/0164709 | A1 | 7/2005 | Balasubramanian et al. |
| 2005/0227619 | A1 | 10/2005 | Lee et al. |
| 2006/0013182 | A1 | 1/2006 | Balasubramanian et al. |
| 2006/0047842 | A1 | 3/2006 | McElwain |
| 2006/0142051 | A1 | 6/2006 | Purnadi et al. |
| 2006/0160551 | A1 | 7/2006 | Matoba et al. |
| 2006/0234719 | A1 | 10/2006 | Demirhan et al. |
| 2007/0053336 | A1 | 3/2007 | Petrovic et al. |
| 2007/0060156 | A1 * | 3/2007 | Cave .............................. 455/450 |
| 2008/0165733 | A1 | 7/2008 | Xiao et al. |
| 2009/0191862 | A1 | 7/2009 | Amirijoo et al. |
| 2011/0064072 | A1 * | 3/2011 | Wang et al. .................... 370/350 |
| 2011/0142009 | A1 | 6/2011 | Lindoff et al. |

OTHER PUBLICATIONS

Adams, S., "The Demands on In-Building Solutions—Using smart antennas and adaptive techniques to improve in-building technique," Wireless Business & Technology Magazine, May 20, 2003.

Spotwave Wireless, Inc., SpotCell 112 (PCS-CDMA), "Product Overview," www.spotwave.com, 2003.

* cited by examiner

METHOD AND SYSTEM FOR MANAGEMENT OF DATA TRANSMISSION IN TIMESLOTS

BACKGROUND

In a cellular wireless communication system, a radio access network (RAN) typically includes a number of base transceiver stations (BTSs), each radiating to define one or more wireless coverage areas (such as a cell and cell sectors) in which served wireless communication devices (WCDs) can operate. In each wireless coverage area, transmissions between the RAN and served WCDs occur through a radio frequency (RF) air interface, with transmissions from the RAN to WCDs defining a "forward link" and transmissions from WCDs to the RAN defining a "reverse link."

The forward link of a wireless coverage area may operate according to time division multiplexing (TDM). Thus, on a recurring basis, a given quantum of time, known as a cycle, may be divided into a series of logical timeslots, and the RAN may transmit data in particular ones of those timeslots, possibly interleaving transmissions to various WCDs.

As the RAN receives incoming data destined for served WCDs, the RAN may buffer the data and may apply a timeslot-scheduling algorithm according to which the RAN allocates upcoming timeslots to carry data destined to particular WCDs. For example, RAN may allocate a fixed number of forward link timeslots to each WCD to which the RAN has data to transmit. Alternatively, the RAN may allocate forward link timeslots to WCDs dynamically based various factors. In any event, the RAN may thus allocate upcoming timeslots to carry data to particular WCDs, and the RAN may then transmit data to the WCDs in the upcoming timeslots according to the allocation.

OVERVIEW

Optimally, the scheduling algorithm that the RAN applies as a basis to allocate upcoming timeslots should provide some level of fairness for the served WCDs that are awaiting receipt of data, so as to help avoid unfair scenarios where one WCD waits a disproportionately long time to receive data while another WCD continues to receive data.

To this end, as the RAN seeks to schedule transmissions in upcoming timeslots, the RAN may apply a "proportional fairness" algorithm that prioritizes transmissions to individual WCDs based on the average throughput that the WCDs have been receiving. According to such an algorithm, the RAN may give higher scheduling priority to a WCD that has been receiving relatively low average throughput from the RAN, and the RAN may give lower scheduling priority to a WCD that has been receiving relatively high throughput from the RAN.

Notwithstanding the proportional fairness algorithm or others like it, however, an issue of fairness may still arise in a wireless communication system in which WCDs are subject to different forward link data transmission rates and thus may require use of different quantities of timeslots for successful forward link transmission.

In such a system, for instance, if a WCD is subject to a high forward link data rate, typically corresponding with high quality wireless coverage, the RAN may be able to transmit a data packet to the WCD with very little error correction, and so the transmission may consume just one or relatively few timeslots. On the other hand, if a WCD is subject to a low forward link data rate, typically corresponding with poor wireless coverage, the RAN may need to transmit more error correction data to the WCD to facilitate successful transmission of a data packet to the WCD, and so the overall transmission may consume a greater number of timeslots. Thus, in a given span of upcoming timeslots, the RAN may be able to schedule transmissions to many high data rate devices but to far fewer low data rate devices. For instance, in a span of 64 upcoming timeslots, the RAN might be able to schedule transmissions to 64 high data rate devices (with each transmission successfully occurring in one timeslot), whereas the RAN might be able to schedule transmissions to just 4 low data rate users (with each packet transmission taking a total of sixteen timeslots to successfully complete).

A problem with such a system may arise in a coverage area where many devices have poor RF conditions and are therefore low data rate devices, and where there are relatively few high data rate devices. In such a situation, the RAN may allocate one or more timeslots for use to transmit data to a high data rate device and, pursuant to the proportional fairness algorithm or the like, may allocate a number of following timeslots for use to transmit data to the low data rate devices. Because the transmissions to the low data rate devices would require many forward link timeslots due to the need for the RAN to transmit error correction data, the high data rate device may then have to wait a fairly long time before again receiving a next high data rate transmission from the RAN. In effect, the use of so many timeslots to serve the low data rate devices "in fairness" after serving the high data rate device may thus starve the high data rate device from receiving additional data for an extended period of time. As a result, a user of the high data rate device may perceive slow or jittery receipt of data, notwithstanding the fact that the high data rate device is in good RF coverage.

Disclosed herein is a method and corresponding system to help improve timeslot scheduling in a wireless communication system. The method may be especially useful in a system such as that described above but may also have broader applicability.

The method seeks to improve scheduling in an upcoming series of timeslots by helping to prevent a relatively small number of devices from monopolizing the forward link timeslots.

In particular, the method seeks to avoid a scenario where the RAN has data queued for transmission to a certain number of WCDs but where the RAN plans to devote the upcoming series of timeslots to transmission of data to just a very small subset of those WCDs. According to the method, the RAN may detect such a scenario and may responsively adjust the scheduling for the upcoming series of timeslots by (i) de-scheduling a number, R, of devices and (ii) newly scheduling in their place a greater number, >R, of devices. To facilitate this, the RAN may de-schedule R devices that are subject to relatively low forward link data rate (and would therefore have consumed many timeslots) and newly scheduling in their place >R devices that are subject to a relatively high forward link data rate (and will therefore each consume fewer timeslots). By de-scheduling R devices and newly scheduling >R devices in their place, the RAN will increase the number of devices that the RAN serves with data in the upcoming series of timeslots, thus helping to avoid the issue noted above.

These as well as other aspects, advantages, and alternatives will become apparent to those of ordinary skill in the art by reading the following detailed description, with reference where appropriate to the accompanying drawings.

DETAILED DESCRIPTION

Figure 1:
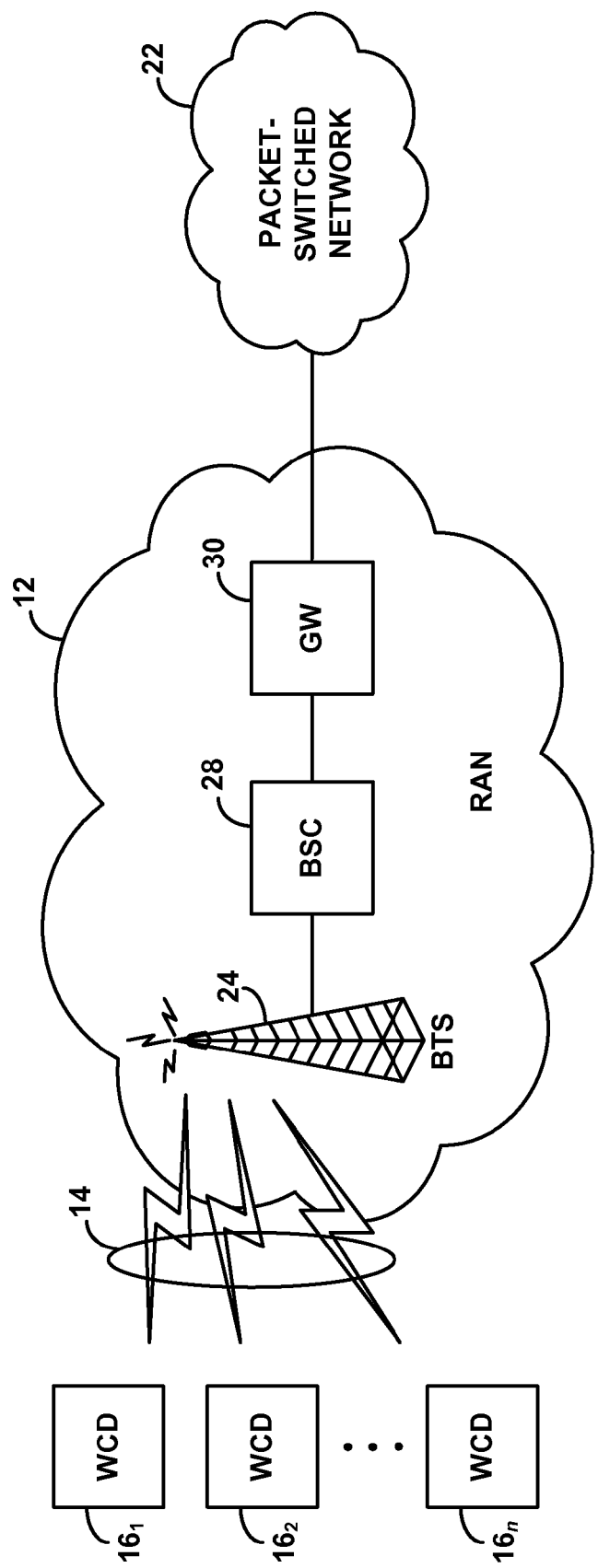
FIG. 1 is a simplified block diagram of an example communication system in which the present method can be implemented.

Referring to the drawings, as noted above, FIG. 1 is a simplified block diagram of a communications network in which the present method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium.

As shown in FIG. 1, the exemplary network includes at its core a radio access network (RAN) 12 that radiates to define a representative coverage area 14. Shown operating in the coverage area are then a number n of example WCDs 16, each of which communicates over the air with the RAN 12. In practice, RAN 12 may then be coupled with a packet-switched transport network 22, such as a wireless service provider's core packet network or the Internet for instance. With this arrangement, each served WCD can engage in wireless communication with the RAN and may thereby communicate with other entities, such as other WCDs served by the RAN or with entities on transport network 22.

RAN 12 can generally take any form, the particular details of which are not critical to this disclosure. At a rudimentary level, for instance, the RAN may comprise a wireless access point router or switch, which communicate on one side with served WCDs and connects on the other side with the transport network.

At a more complex level (as shown), but still by way of example, the RAN may be a cellular radio access network. As shown, such a network may include a BTS 24 with an antenna arrangement that radiates to define coverage area 14 such as a cell sector in which the illustrated WCDs can operate. The BTS is then integrated or coupled with a BSC 28 (also referred to as a radio network controller (RNC)), which connects with a gateway 30 such as a packet data serving node (PDSN) that provides connectivity with transport network 22. The BTS and BSC will each preferably include at least one processor, data storage, and program instructions stored in the data storage and executable by the processor, to be able to implement functions described herein for instance.

In general, communications between the BTS and the WCDs in coverage area 14 may occur on one or more carrier frequencies, such as a band centered around a particular carrier frequency. Further, the forward link from the BTS to the WCDs is preferably TDM, defining a continuum of timeslots in which the BTS is set to transmit to the WCDs and in which the WCDs are set to receive from the BTS.

Without limitation, an example TDM protocol is IS-856 (also known as EV-DO). Under a representative version of IS-856, the forward link is divided into timeslots of length 2048 chips, and each timeslot is further time division multiplexed to define various channels, including a pilot channel, a Media Access Control (MAC) channel, and, if any traffic exists, a forward traffic channel. The reverse link then defines a "data rate control" (DRC) channel that the WCD can use to inform the RAN of what data rate the WCD should be capable of receiving on the forward link, based on the WCD's evaluation of signal-to-noise ratio on the forward link.

In practice, under IS-856, a WCD operating in a particular coverage area will regularly monitor the signal-to-noise ratio (C/I) of the pilot signal that the WCD receives in that coverage area, and based on the measured C/I, the WCD will regularly select and send to the RAN (on the DRC channel) a DRC value that indicates a supportable forward link data rate for the WCD. The RAN will then schedule transmissions to the WCD with the assumption that that data rate would work.

The theory of this process is that if the WCD is receiving a particularly strong pilot signal (high C/I) from the RAN, the WCD should be able to receive data transmissions from the RAN at a particularly high data rate, as less error correction should be required to facilitate successful transmission. Whereas, if the WCD is receiving a particularly weak pilot signal (low C/I) from the RAN, the WCD may not be able to receive data transmissions from the RAN at a high data rate, since more error correction will likely be required to facilitate successful transmission. Thus, if the WCD sends a DRC that indicates a high data rate, the RAN may plan to schedule transmissions to the WCD to occur in relatively few timeslots, as the transmissions should theoretically succeed without the need for much if any error correction. Whereas, if the WCD sends a DRC that indicates a low data rate (due to low detected C/I), the RAN may plan to schedule transmissions to the WCD to occur in a greater number of timeslots, as the transmissions should theoretically require more error correction to succeed.

To acquire wireless packet data connectivity under IS-856, after a WCD first detects an IS-856 carrier, the WCD sends to the RAN a UATI (Universal Access Terminal Identifier) request, and receives in response an International Mobile Station Identifier (IMSI), which the WCD can then use to identify itself in subsequent communications with the RAN. The WCD then sends a connection-request to the RAN, and the RAN responsively invokes a process to authenticate the WCD and to have the WCD acquire a data link. In particular, after authenticating the WCD, the WCD may communicate with gateway 30 to acquire a data link and an Internet Protocol (IP) address that the WCD can use to engage in communications on the transport network 22. The RAN may then prepare itself to transmit to the WCD any incoming data that is destined for the WCD, such as data that the RAN receives from correspondent nodes on network 22 for instance.

Once the WCD has acquired an IS-856 connection with the RAN, the WCD is considered to be in an active mode, in which the RAN may receive incoming data destined to the WCD and transmit the data in forward link timeslots to the WCD. As in other air interface protocols, if no data traffic passes to or from the WCD for a threshold period of time, the WCD may enter a dormant mode. In the dormant mode, an IS-856 system maintains the logical state of the WCD's session (e.g., IP address, data link state, and radio link session information) while releasing other radio resources that were reserved for use by the WCD. With the maintained session state, the WCD can then quickly re-acquire a connection so as to send or receive packet data, thereby giving the appearance that the WCD is "always on."

In general, as an IS-856 RAN receives data destined to WCDs, the RAN may buffer the data for ultimate transmission according to the RAN's timeslot scheduling algorithm. In practice, for instance, the RAN may maintain a logical queue respectively for each WCD in the coverage area, with the queue holding data destined to the WCD on a first-in-first-out basis. Thus, as the RAN receives data to be transmitted to a particular WCD, the RAN may place the data in that WCD's queue. And in accordance with the RAN's timeslot scheduling algorithm, the RAN may take data from the various WCD queues for transmission in assigned timeslots to the WCDs.

Figure 2:
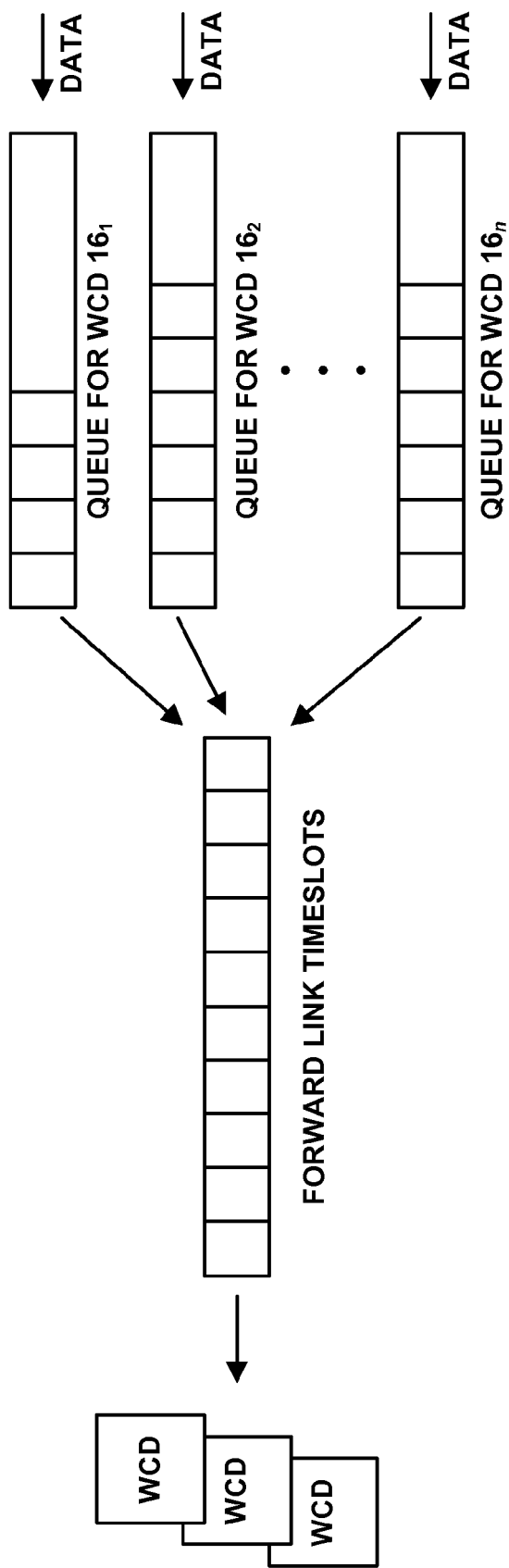
FIG. 2 is an illustration of data queues feeding a TDM forward link

FIG. 2 shows an example of this arrangement, where the RAN includes a logical queue 32 respectively for each of the WCDs 16 that is currently active in coverage area 14, and where the forward link in the coverage area is divided into a continuum of timeslots 34 in which data may be transmitted in segments reserved to carry traffic. As shown, as the RAN receives data destined to individual WCDs, the RAN may place the data in the queues defined for those WCDs. Pursuant to the RAN's timeslot scheduling algorithm, the RAN may then selectively obtain data from the various queues and transmit the data in forward link timeslots to the WCDs.

As noted above, the present method strives to avoid a scenario where the RAN allows a series of timeslots to be monopolized by a relatively small subset of the WCDs to which the RAN currently has data to transmit. The method applies with respect to a defined upcoming series of timeslots, as the RAN works to schedule those timeslots for transmissions to various WCDs. For instance, the method may be carried out every 64 slots, or every 128 slots, or on some other periodic or aperiodic basis. Further, the method assumes that the RAN has already gone through a process of scheduling transmissions in the series of timeslots, so that particular timeslots of the series are currently allocated for use to carry data to particular WCDs. For instance, the RAN may have used the proportional fairness algorithm or another algorithm to establish the current allocation.

In accordance with the method, the RAN may determine the total number, C, of WCDs to which the RAN currently has data to transmit, i.e., the WCDs that are currently contending for the timeslots, or "contending WCDs". Further, the RAN may determine the total number, N, of WCDs to which the RAN has currently scheduled data transmission in the series of slots at issue, i.e., "scheduled WCDs." The RAN may then determine whether the number N of scheduled WCDs is a threshold small portion of the number C of contending WCDs, which would mean that a threshold small subset of the WCDs to which the RAN currently has data to transmit will monopolize the timeslots of the series.

In an implementation where the RAN maintains queues separately for each contending WCD, the RAN can determine the count C by determining the number of such queues that currently hold data. Further, as the RAN schedules timeslots, the RAN can keep track of the number N of scheduled WCDs. In practice, the RAN may then compute a ratio N/C, as an indication of the subset of contending WCDs that are currently scheduled for the upcoming timeslots. And the RAN may then determine whether that ratio is threshold small. For instance, the RAN may determine whether the ratio is lower than 0.2 or lower than some other designated threshold.

If the RAN determines that the ratio is not threshold small or otherwise that N is not a threshold small portion of C, then the RAN may proceed to transmit to the WCDs in accordance with the schedule. However, if the RAN determines that the ratio is threshold small or otherwise that N is a threshold small portion of C, then the RAN may take action to help avoid that occurrence, by de-scheduling at least one of the scheduled WCDs and newly scheduling in place of the de-scheduled WCD(s) a greater number of WCDs. In particular, the RAN will de-schedule R of the scheduled WCDs (where R is at least one) and will newly schedule, in the timeslots that were scheduled to carry data to the R WCDs, transmissions to >R (i.e., greater than R) of the contending WCDs.

The act of de-scheduling a WCD involves taking back at least one timeslot that had been allocated for use to carry data to the WCD, thus making the timeslot(s) available for use to carry data to one or more other WCDs instead. In the span of the timeslots at issue (e.g., 64 slots or 128 slots), this may mean that a given scheduled WCD may become altogether unscheduled, meaning that none of the timeslots in the span would be allocated to carry data to the WCD. Alternatively, notwithstanding the RAN taking back one or more timeslots that were allocated for use to carry data to the WCD, the RAN may still have one or more other timeslots in the span that are allocated to carry data to the WCD. Thus, the WCD may be fully or just partially de-scheduled from timeslots of the span at issue.

In order to de-schedule R WCDs and to newly schedule in their place greater than R WCDs, the RAN may select as the replacement WCDs any WCDs that have a higher designated forward link data rate than the de-scheduled WCDs (e.g., by determining a highest forward link data rate of the R devices being de-scheduled and selecting the >R unscheduled devices such that each of the >R unscheduled devices has a data rate higher than that determined maximum). The theory here is that a WCD with a higher forward link data rate should be able to successfully receive data with less error correction and thus in fewer timeslots than a WCD with a lower forward link data rate. Thus, if the RAN de-schedules R WCDs, the RAN should theoretically be able to newly schedule in their place >R WCDs with forward link data rates higher than the R WCDS.

In practice, the RAN may select the R WCDs to de-schedule by evaluating the average throughput of the WCDs that are currently scheduled in the span of timeslots at issue and selecting as the R WCDs one or more of the WCDs that has received the highest average throughput over some defined sampling period (e.g., the devices to which the RAN has allocated the greatest number of timeslots over time). Of the currently unscheduled but contending WCDs (i.e., the C−N WCDs), the RAN may then select WCDs that have higher forward link data rates (e.g., per their DRCs) than each of the R WCDs that are to be de-scheduled. This may be an iterative process if necessary to help fill in the slots of the de-scheduled WCDs with data for transmission to a greater number of WCDs.

Figure 3:
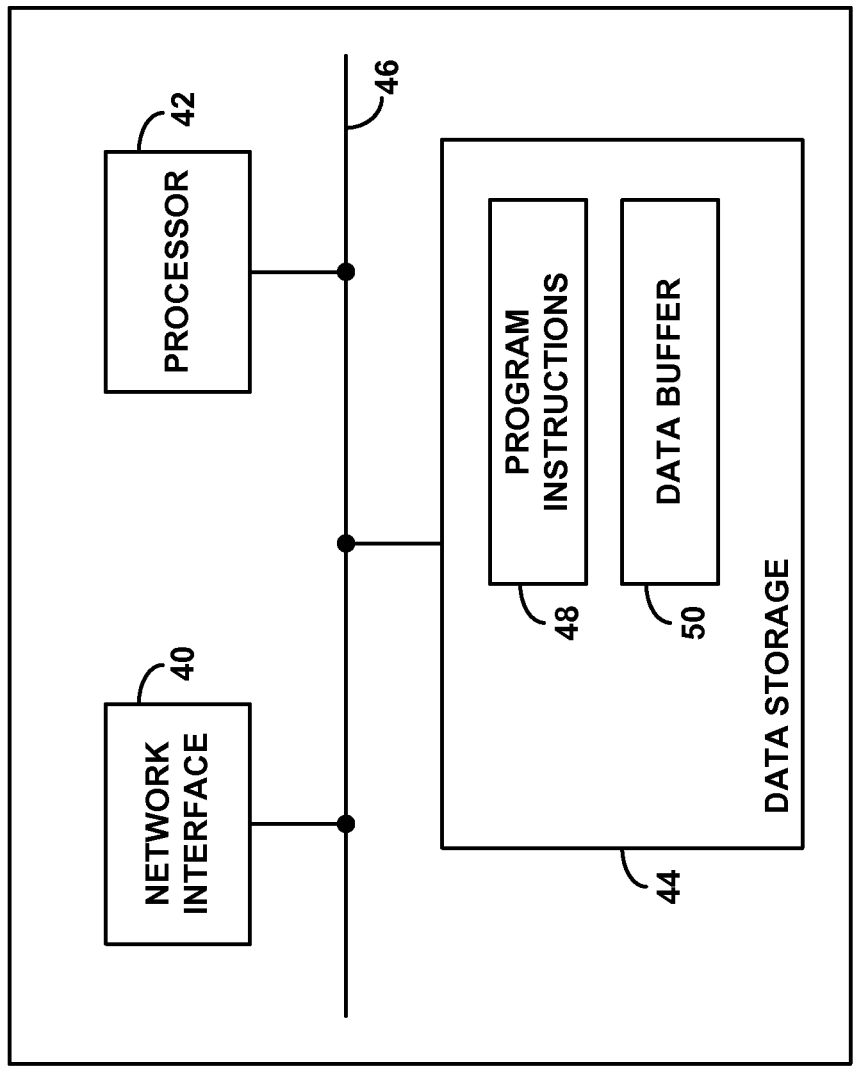
FIG. 3 is a simplified block diagram of a network entity arranged to implement the present method.

As noted above, the present method can be carried out by a BTS, a BSC, or a combination of these entities. More generally, the process can be carried out by any RAN entity that functions to receive data for transmission to WCDs and to schedule transmission of the data in upcoming TDM timeslots. FIG. 3 is a simplified block diagram showing some of the functional components that can be included in such an entity.

As shown in FIG. 3, the example entity includes a network interface 40, a processor 42, and data storage 44, all of which may be communicatively linked together by a system bus, network, or other connection mechanism 46.

The network interface 40 may comprise a receive-interface for receiving data that is destined for transmission to particular WCDs, such as packet data arriving from network 22 for instance, and a transmit-interface for transmitting the data in TDM timeslots for receipt by the destination WCDs. These interfaces may be integrated together or may be provided separately in various configurations, depending on which RAN entity carries out the method. By way of example, if BTS 24 carries out the method, the receive-interface may be a backhaul interface through which the BTS receives data from BSC 28, and the transmit-interface may comprise an amplifier and antenna arrangement for transmitting on the forward link air interface. As another example, if the BSC 28 carries out the method, the receive-interface may be a backhaul interface through which the BSC 28 receives data from gateway 30, and the transmit-interface may be a backhaul interface through which the BSC transmits data (in a scheduled order) to the BTS for the BTS to transmit (in the scheduled order) over the forward link air interface. Other examples are possible as well.

Processor 42 may comprise one or more general purposes processors (e.g., INTEL microprocessors) and/or one or more special purpose processors (e.g., application specific integrated circuits or digital signal processors) and may be integrated in whole or in part with the network interface 40. Data storage 44, in turn, may comprise one or more volatile and/or non-volatile storage components, such as magnetic, optical, flash, or other storage components, and may be integrated in whole or in part with processor 42.

As shown, data storage 44 may contain program instructions 48 executable or interpretable by processor 42 to carry out various functions described herein. As such, in operation, data storage 44 may also contain a data buffer 50 defining data queues that hold data received by the RAN for transmission to various served WCDs, and an output queue for holding data scheduled for transmission on the forward link to the WCDs. And the program instructions may define scheduling logic to facilitate the scheduling, including the adjustment of scheduling, described herein.

Figure 4:
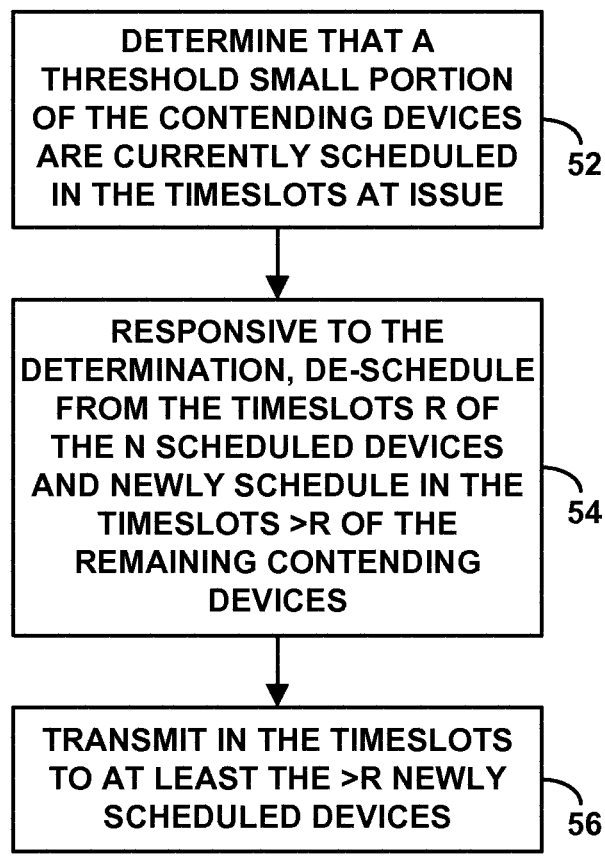
FIG. 4 is a flow chart depicting functions that can be carried out in accordance with the present method.

FIG. 4 is next a flow chart summarizing some of the functions that can be carried out in accordance with an example implementation of the present method, to manage transmission of data in an upcoming series of timeslots on a forward link air interface from a RAN. The method assumes that the RAN currently has data to transmit to a first number, C, of devices, and that the RAN has currently allocated the timeslots for use to carry data to just a second number, N, of those C devices (where N<C), thereby defining for the timeslots a total of N scheduled devices and a total of C−N unscheduled devices.

As shown in FIG. 4, at block 52, the method involves the RAN determining that N is less than a defined threshold portion of C. (This function can be carried out by determining that N is a threshold small portion of C, such as by determining that a ratio of N/C is less than a particular threshold or is not greater than a particular threshold). At block 54, the method then involves, responsive to making that determination, (i) the RAN de-scheduling from the timeslots R of the N scheduled devices, and (ii) newly scheduling in the timeslots >R of the C−N unscheduled devices in place of the de-scheduled R devices. Further, at block 56, the method then involves the RAN transmitting in the timeslots to at least the >R newly scheduled devices.

As noted above, after the RAN carries out this method with respect to an upcoming series of timeslots, the RAN may then repeat the method again for a next upcoming series of timeslots. For instance, the RAN may repeat the method periodically every 64 timeslots or every 128 timeslots, or at some other period.

An exemplary embodiment of the present invention has been described above. Those skilled in the art will appreciate, however, that many variations from the embodiment are possible while remaining within the spirit and scope of the claims.

We claim:

1. A method for a radio access network (RAN) to manage transmission of data in an upcoming series of timeslots on a forward link air interface from the RAN, wherein the RAN currently has data to transmit to a first number, C, of devices, and wherein the RAN has currently allocated the timeslots for use to carry data to just a second number, N, of those C devices (wherein N<C), thereby defining for the timeslots a total of N scheduled devices and a total of C−N unscheduled devices, the method comprising:
   the RAN determining that N is less than a defined threshold portion of C;
   responsive to the determining, (i) the RAN de-scheduling, from the timeslots, a third number, R, of the N scheduled devices, and (ii) newly scheduling, in the timeslots that were allocated to carry data to the R devices, transmissions to the >R of the C−N unscheduled devices in place of the de-scheduled R devices; and
   the RAN transmitting in the timeslots to at least the >R newly scheduled devices.

2. The method of claim 1, wherein determining that N is less than a defined threshold portion of C comprises determining that a ratio N/C is less than a defined threshold.

3. The method of claim 1, wherein each of the C devices currently has a respective forward link data rate, the method further comprising:
   the RAN selecting the R scheduled devices and the >R unscheduled devices based on forward link data rates of the R scheduled devices and the >R unscheduled devices.

4. The method of claim 3, wherein selecting the R scheduled devices and the >R unscheduled devices based on forward link data rates of the R scheduled devices and the >R unscheduled devices comprises:
   selecting the >R unscheduled devices such that the forward link data rate respectively of each of the >R unscheduled devices is greater than the forward link data rate of each of the N scheduled devices.

5. The method of claim 4, wherein selecting the >R unscheduled devices such that the forward link data rate respectively of each of the >R unscheduled devices is greater than the forward link data rate of each of the R scheduled devices comprises:
   determining a highest forward link data rate of the R scheduled devices; and
   selecting the >R unscheduled devices such that each of the >R unscheduled devices has a forward link data rate greater than the determined highest forward link data rate.

6. The method of claim 3, wherein selecting the R scheduled devices to de-schedule comprises determining, of the N scheduled devices, which R devices the RAN has allocated a greatest number of timeslots to over time, and selecting those determined devices as the R devices.

7. The method of claim 1, further comprising repeating the method for a next upcoming group of timeslots.

8. The method of claim 1, wherein all C of the devices are currently in an active state awaiting data transmission from the RAN.

9. The method of claim 1, carried out by a base transceiver station (BTS) of the RAN.

10. A radio access network (RAN) arranged to manage transmission of data in an upcoming series of timeslots on a forward link air interface from the RAN, the RAN comprising:
- an antenna arrangement for radiating to define a wireless coverage area having the forward link air interface for carrying transmissions from the RAN;
- a data buffer for holding data that is to be transmitted by the RAN to devices served by the RAN in the wireless coverage area; and
- scheduling logic executable by the RAN to schedule data transmission in the upcoming series of timeslots, wherein the scheduling logic causes the RAN to carry out functions comprising: (a) determining that the data buffer currently holds data to transmit to a first number, C, of devices, (b) determining that the RAN has currently scheduled the timeslots for use to carry data to just a second number, N, of those C devices (wherein N<C), thereby defining for the timeslots a total of N scheduled devices and C−N unscheduled devices, (c) determining that N is less than a defined portion of C, and (d) responsive to determining that N is less than the defined portion of C, carrying out a scheduling-adjustment process,
- wherein the scheduling-adjustment process comprises (i) de-scheduling, from the timeslots, a third number, R, of the N scheduled devices, and (ii) newly scheduling, in the timeslots that were scheduled to carry data to the R devices, transmissions to >R of the C−N unscheduled devices in place of the de-scheduled R devices, and wherein, after carrying out the scheduling-adjustment process, the RAN transmits in the timeslots to at least the >R newly scheduled devices.

11. The RAN of claim 10, wherein the scheduling logic comprises program instructions stored in non-transitory data storage and executable by a processing unit of the RAN.

12. The RAN of claim 10, wherein determining that N is less than a defined threshold portion of C comprises determining that a ratio N/C is less than a defined threshold.

13. The RAN of claim 1, wherein each of the C devices currently has a respective forward link data rate, and wherein the scheduling logic is further executable by the RAN to select the R scheduled devices and the >R unscheduled devices based on forward link data rates of the R scheduled devices and the >R unscheduled devices.

14. The RAN of claim 13, wherein selecting the R scheduled devices and the >R unscheduled devices based on forward link data rates of the R scheduled devices and the >R unscheduled devices comprises:
- selecting the >R unscheduled devices such that the forward link data rate respectively of each of the >R unscheduled devices is greater than the forward link data rate of each of the R scheduled devices that are being de-scheduled.

15. The RAN of claim 14, wherein selecting the >R unscheduled devices such that the forward link data rate respectively of each of the >R unscheduled devices is greater than the forward link data rate of each of the R scheduled devices that are being de-scheduled comprises:
- determining a highest forward link data rate of the R scheduled devices that are being de-scheduled; and
- selecting the >R unscheduled devices such that each of the >R unscheduled devices has a forward link data rate greater than the determined highest forward link data rate.

16. The RAN of claim 13, wherein selecting the R scheduled devices to de-schedule comprises determining, of the N scheduled devices, which R devices the RAN has allocated a greatest number of timeslots to over time, and selecting those determined devices as the R devices.

17. The RAN of claim 10, wherein the scheduling logic is executable to repeat the functions for a next group of timeslots as well.

18. The RAN of claim 10, wherein all C of the devices are currently in an active state awaiting data transmission from the RAN.

19. The RAN of claim 10, further comprising a base transceiver station (BTS), wherein the antenna arrangement, data buffer, and scheduling logic are each part of the BTS.

* * * * *